(12) United States Patent
Tang et al.

(10) Patent No.: US 8,622,358 B2
(45) Date of Patent: Jan. 7, 2014

(54) MOUNTING STRUCTURE OF COMPUTER

(75) Inventors: Xian-Xiu Tang, Shenzhen (CN); Zhen-Xing Ye, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 364 days.

(21) Appl. No.: 12/824,475

(22) Filed: Jun. 28, 2010

(65) Prior Publication Data

US 2011/0297803 A1  Dec. 8, 2011

(30) Foreign Application Priority Data

Jun. 2, 2010  (CN) .......................... 2010 1 0190272

(51) Int. Cl.
*A47F 5/00*  (2006.01)

(52) U.S. Cl.
USPC ..................................... 248/298.1; 248/274.1

(58) Field of Classification Search
USPC ................. 248/298.1, 297.21, 297.11, 316.8, 248/223.21, 225.11, 274.1; 312/223.2, 236; 316/679.46, 694, 695, 696, 697, 316/679.54, 679.47, 679.48; 403/63, 116, 403/117, 335, 336, 337, 112, 408.1
See application file for complete search history.

(56) References Cited

U.S. PATENT DOCUMENTS

| | | | | |
|---|---|---|---|---|
| 1,855,751 | A * | 4/1932 | Buchanan | 248/231.21 |
| 4,367,652 | A * | 1/1983 | Venuso | 73/861 |
| 5,606,147 | A * | 2/1997 | Deschamps et al. | 174/491 |
| 7,085,491 | B2 * | 8/2006 | Chiang | 396/432 |

* cited by examiner

*Primary Examiner* — Alfred J Wujciak
(74) *Attorney, Agent, or Firm* — Altis Law Group, Inc.

(57) ABSTRACT

An exemplary mounting structure is adapted for supporting an apparatus of a computer. The mounting structure includes a securing bracket and a connecting bracket. The connecting bracket is mounted on the securing bracket and is slidable along a first axis relative to the securing bracket. The connecting bracket is adapted for supporting the apparatus thereon. The apparatus is slidable along a second axis relative to the connecting bracket.

14 Claims, 6 Drawing Sheets

MOUNTING STRUCTURE OF COMPUTER

BACKGROUND

1. Technical Field

The present disclosure relates to mounting structures of computers, and more particularly to a mounting structure of a computer which can slidably support apparatuses of the computer thereon.

2. Description of Related Art

Conventionally, a plurality of apparatuses, such as fans and hard drives, are mounted in a computer by mounting brackets. Once the apparatuses are mounted, the apparatuses cannot normally be moved relative to the mounting brackets. When positions of electronic components of the computer are changed or new electronic components are added, the apparatuses may interfere with changed or added electronic components.

It is thus desirable to provide a mounting structure which can overcome the described limitations.

DETAILED DESCRIPTION

Figure 1:
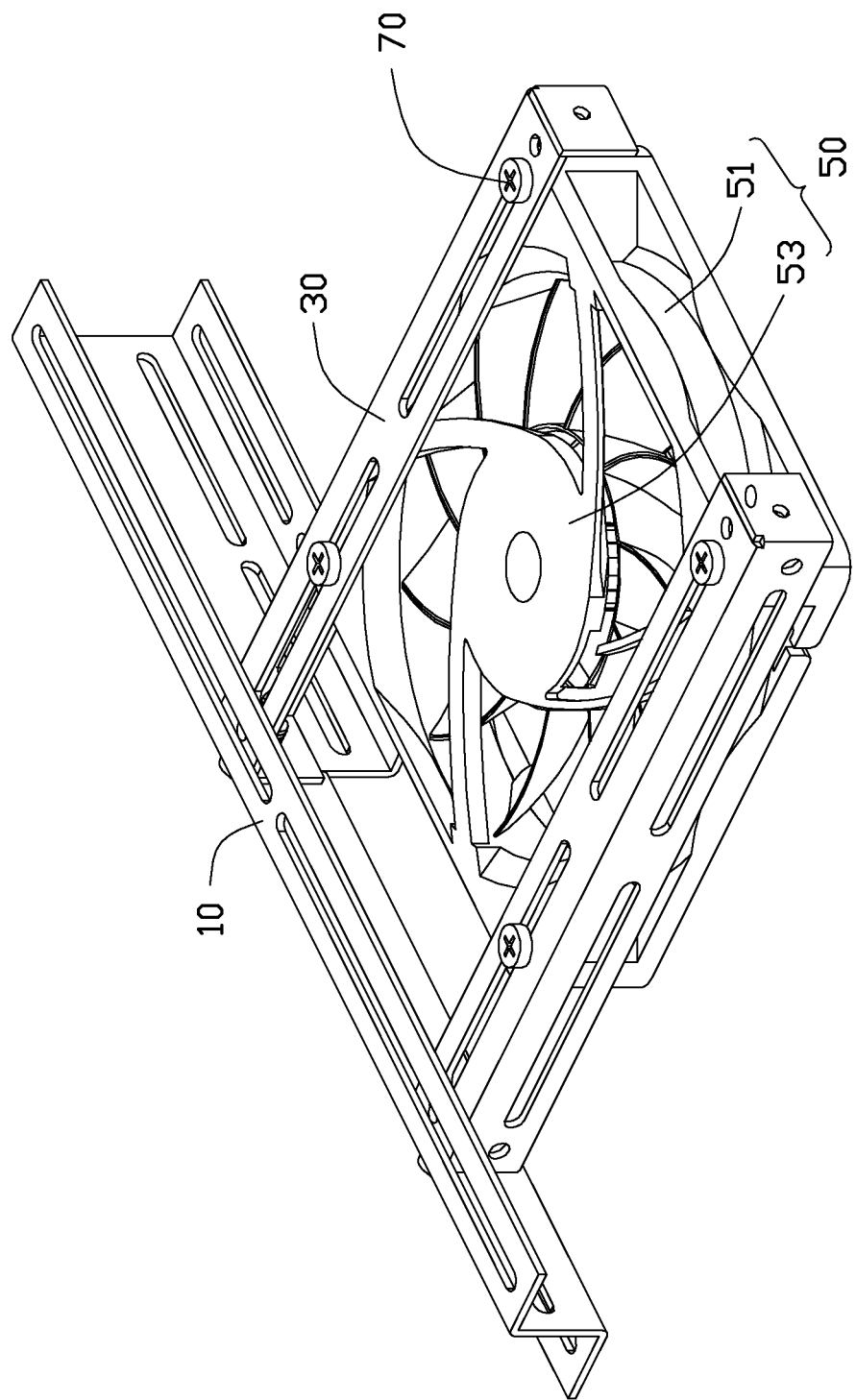
FIG. 1 is an assembled view showing a mounting structure of the present disclosure in use, wherein the mounting structure is used for supporting a fan.

Referring to FIG. 1, a mounting structure of the present disclosure is secured in a computer (not shown) to support apparatuses of the computer. The mounting structure includes a securing bracket 10, and two connecting brackets 30. The securing bracket 10 is fixed on the computer. The two connecting brackets 30 are mounted on the securing bracket 10 and are slidable along the securing bracket 10. The apparatuses of the computer are mounted on the connecting brackets 30 and are slidable along the connecting brackets 30. The apparatuses may be hard drives, memories, or fans, etc. In this exemplary embodiment, one apparatus is illustrated. The apparatus is a fan 50.

In the description that follows, orientations of all of elements of the mounting structure of this disclosure accord with orientations of all of the elements of FIG. 1.

Figure 2:
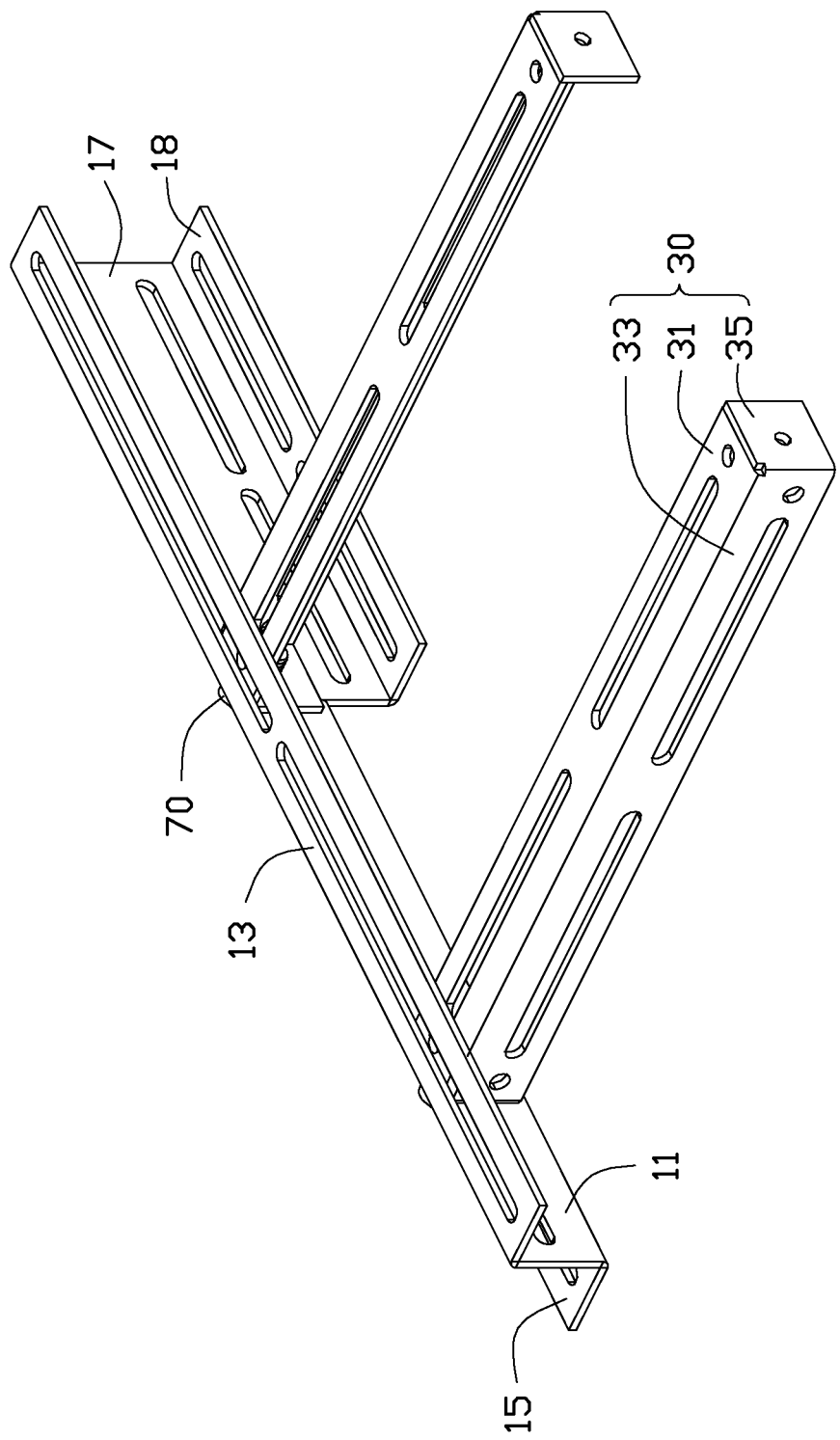
FIG. 2 is similar to FIG. 1, but showing only the mounting structure.
Figure 3:
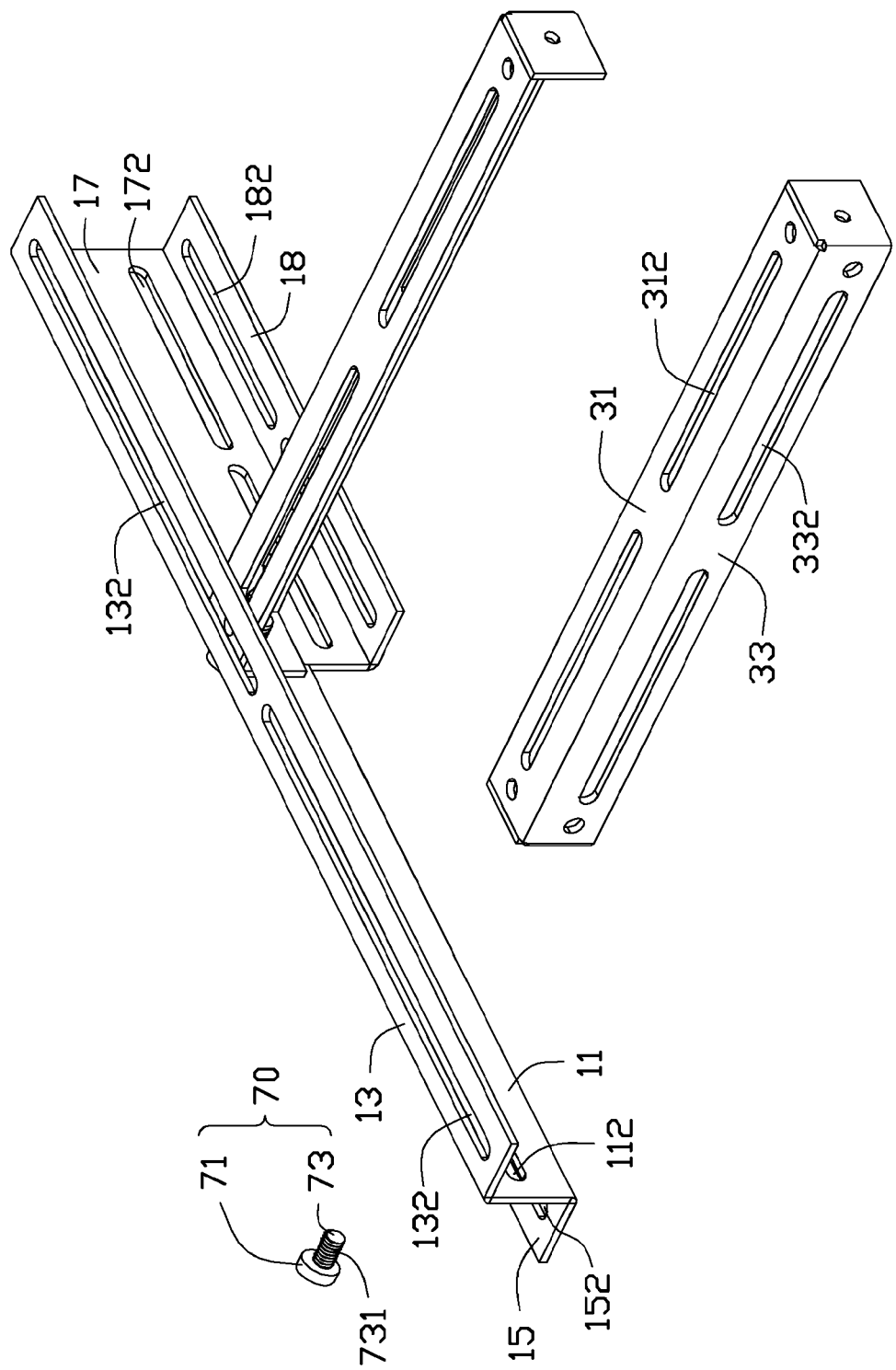
FIG. 3 is a partly exploded view of the mounting structure of FIG. 2.
Figure 4:
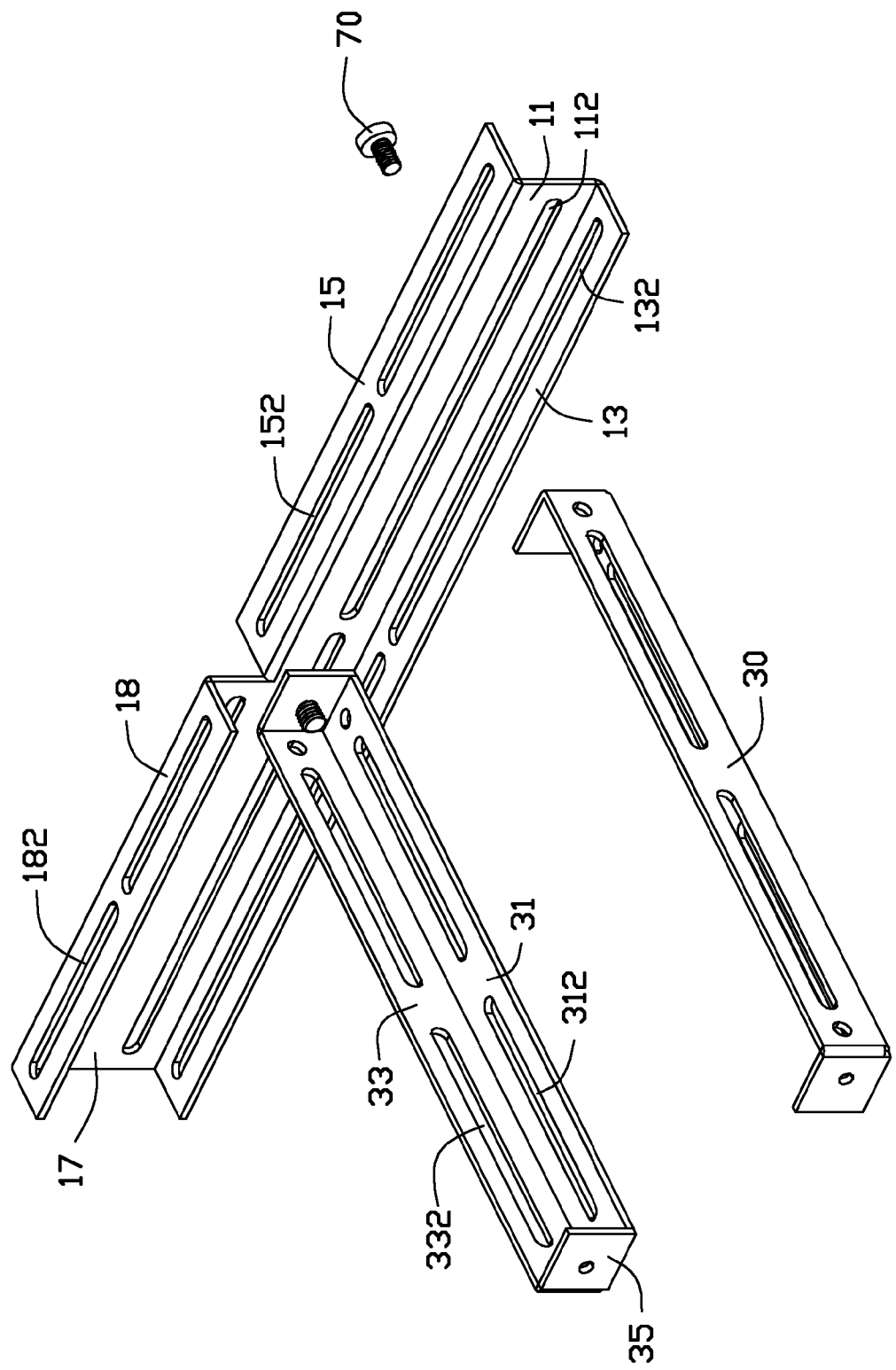
FIG. 4 is an inverted view of FIG. 3.

Referring also to FIGS. 2-4, the securing bracket 10 is metallic and includes a connecting plate 11, a first flange 13, a second flange 15, a third flange 18 and an extending plate 17. The connecting plate 11 is an elongated plate. Two slots 112 are defined in a central portion of the connecting plate 11 along a longitudinal direction of the connecting plate 11. The two slots 112 align with each other end to end, and are spaced from each other.

The first flange 13 is an elongated plate, and perpendicularly extends from a top end of the connecting plate 11. The first flange 13 is located at a rear side of the connecting plate 11. Two slots 132 are defined in a central portion of the first flange 13 along a longitudinal direction of the first flange 13. The two slots 132 align with each other end to end, and are spaced from each other.

The second flange 15 is an elongated plate, and perpendicularly extends from a left side of a bottom end of the connecting plate 11. The second flange 15 is located at a front side of the connecting plate 11 and is parallel to the first flange 13. A length of the second flange 15 is equal to half that of the first flange 13. Two slots 152 are defined in a central portion of the second flange 15 along a longitudinal direction of the second flange 15. The two slots 152 align with each other end to end, and are spaced from each other.

The extending plate 17 extends downwardly from a right side of the bottom end of the connecting plate 11. The extending plate 17 is coplanar with the connecting plate 11. Two slots 172 are defined in a central portion of the extending plate 17 along a longitudinal direction of the extending plate 17. The two slots 172 align with each other end to end, and are spaced from each other. The third flange 18 perpendicularly extends from a bottom end of the extending plate 17. The third flange 18 faces and is parallel to a right portion of the first flange 13. Two slots 182 are defined in a central portion of the third flange 18 along a longitudinal direction of the third flange 18. The two slots 182 align with each other end to end, and are spaced from each other. A length of the extending plate 17 is equal to half of that of the first flange 13, and equal to that of the third flange 18.

Each of the connecting brackets 30 includes an elongated first mounting plate 31, an elongated second mounting plate 33, and two combining plates 35. Two slots 312 are defined in a central portion of the first mounting plate 31 along a longitudinal direction of the first mounting plate 31. The two slots 312 align with each other end to end, and are spaced from each other. The second mounting plate 33 perpendicularly extends downwardly from a long edge of the first mounting plate 31. Two slots 332 are defined in a central portion of the second mounting plate 33 along a longitudinal direction of the second mounting plate 33. The two slots 332 align with each other end to end, and are spaced from each other. Each of the combining plates 35 is a rectangular sheet. One combining plate 35 perpendicularly connects front ends of the first and second mounting plates 31, 33, and the other combining plate 35 perpendicularly connects rear ends of the first and second mounting plates 31, 33.

A plurality of connecting members 70 connect the connecting brackets 30 with the securing bracket 10 and connect the fan 50 with the connecting brackets 30. Each connecting member 70 includes an operating portion 71, and a securing portion 73 extending from a central portion of the operating portion 71. Each of the operating portion 71 and the securing portion 73 is cylindrical. A diameter of the operating portion 71 is larger than a transverse width of the slot 112 of the connecting plate 11 of the securing bracket 10. A continuous thread 731 is formed on the securing portion 73. A length of the securing portion 73 is larger than a thickness of the connecting plate 11. A diameter of the securing portion 73 is smaller than the transverse width of the slot 112. In the illustrated embodiment, each connecting member 70 is in the form of a fastener such as a screw. In particular, the operating portion 71 is a head of a screw, and the securing portion 73 is a shaft of the screw.

The fan 50 includes a rectangular frame 51, and a blade assembly 53 enclosed by the frame 51. The frame 51 is approximately square, and a length of each side of the frame 51 is less than a length of each of the first and second mounting plates 31, 33 of the connecting bracket 30.

When the mounting structure is assembled, the two front combining plates 35 of the two connecting brackets 30 face the two slots 112 of the connecting plate 11 of the securing bracket 10. The two securing portions 73 of two corresponding connecting members 70 extend through the slots 112 and engage with the front combining plates 35 to connect the connecting brackets 30 with the securing bracket 10. In this state, the connecting plate 11 is sandwiched between the operating portions 71 of the connecting members 70 and the front combining plates 35. The connecting members 70 are loosely engaged with the securing bracket 10 and provisionally engaged with the connecting brackets 30, and the securing portions 73 are thereby slidable along the slots 112 to allow the connecting brackets 30 to slide relative to the securing bracket 10 to desired positions. The two first mounting plates 31 of the connecting brackets 30 are parallel and coplanar. The second mounting plates 33 of the connecting brackets 30 are parallel and face each other. The first and second mounting plates 31, 33 of the connecting brackets 30 are perpendicular to the connecting plate 11 of the securing bracket 10. In other embodiments, the connecting brackets 30 may be assembled on the first flange 13, the second flange 15, the third flange 18, or the extending plate 17 of the securing bracket 10, by way of the securing members 70 extending through the slots 132, 152, 182, or 172 respectively and engaging with the connecting brackets 30. In such cases, the connecting brackets 30 are slidable along the slots 132, 152, 182, or 172, respectively.

Referring to FIG. 1 again, when the fan 50 is mounted on the connecting brackets 30 as shown, the fan 50 is horizontal and the frame 51 of the fan 50 is sandwiched between the second mounting plates 33 of the two connecting brackets 30. The first mounting plates 31 of the two connecting brackets 30 abut against opposite sides of a top end of the frame 51. The securing portions 73 of another four of the connecting members 70 extend through the four slots 312 of the two first mounting plates 31 and are provisionally engaged with lateral portions of the frame 51, to thereby slidably assemble the fan 50 on the connecting brackets 30. In this state, the securing portions 73 are slidable along the slots 312 to allow the fan 50 to move toward or away from the securing bracket 10 as desired.

The connecting brackets 30 are operated to make them slide along the slots 112 of the connecting plate 11 of the securing bracket 10 and thereby allow the connecting brackets 30 to move to specific desired positions. Then, the connecting members 70 are tightened to make the connecting brackets 30 securely fixed in the desired position on the securing bracket 10. Then, the fan 50 is operated to slide along the slots 312 of the first mounting plates 31 of the connecting brackets 30 to a specific desired position.

Figure 5:
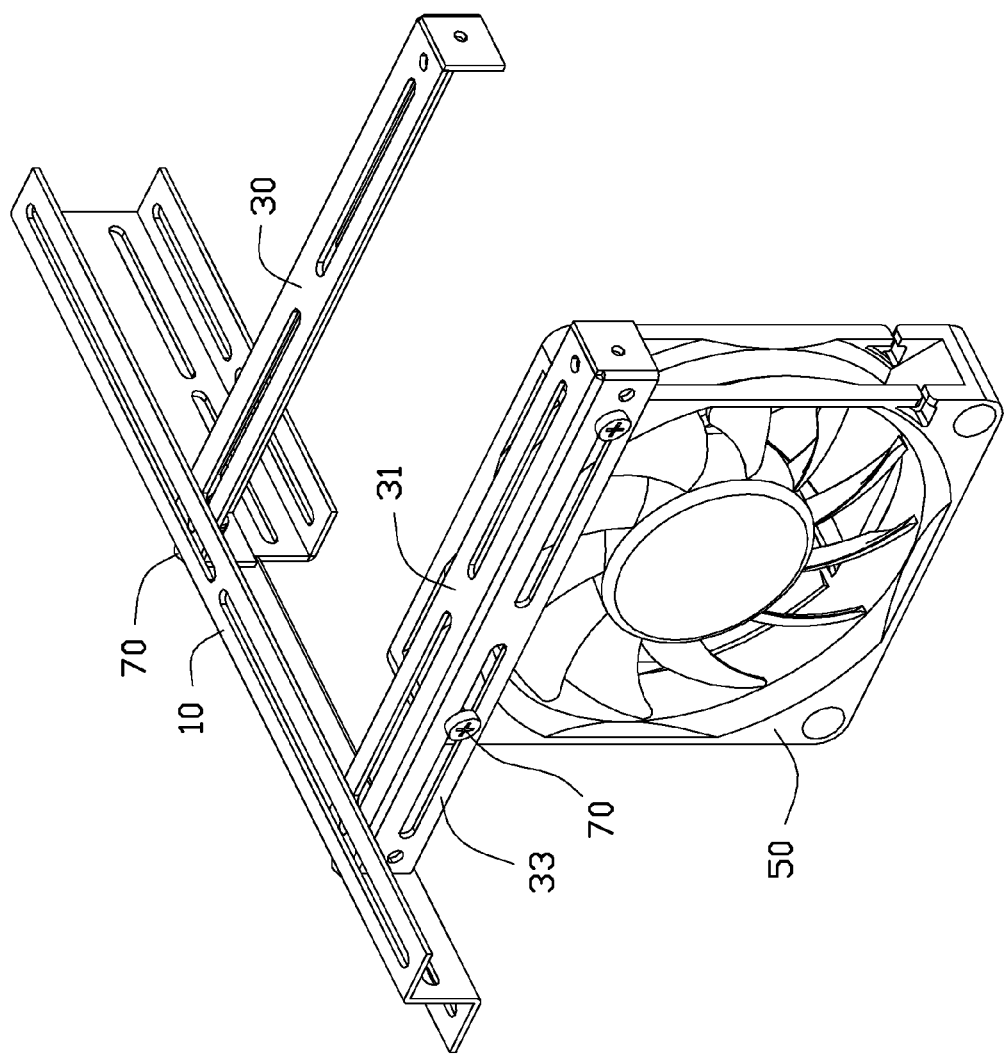
FIG. 5 shows the mounting structure of FIG. 1 supporting the fan in an alternative manner.

Referring to FIG. 5, in this example, the fan 50 is assembled on one connecting bracket 30. The fan 50 is vertical. One of the sides of the frame 51 abuts against the first mounting plate 31 of the connecting bracket 30 and is sandwiched between the two combining plates 35. The securing portions 73 of two corresponding connecting members 70 extend through the slots 332 of the second mounting plate 33, and are provisionally engaged with lateral portions of the top end of the frame 51 to assemble the fan 50 on the connecting bracket 30. In this state, the securing portions 73 are slidable along the slots 332.

Figure 6:
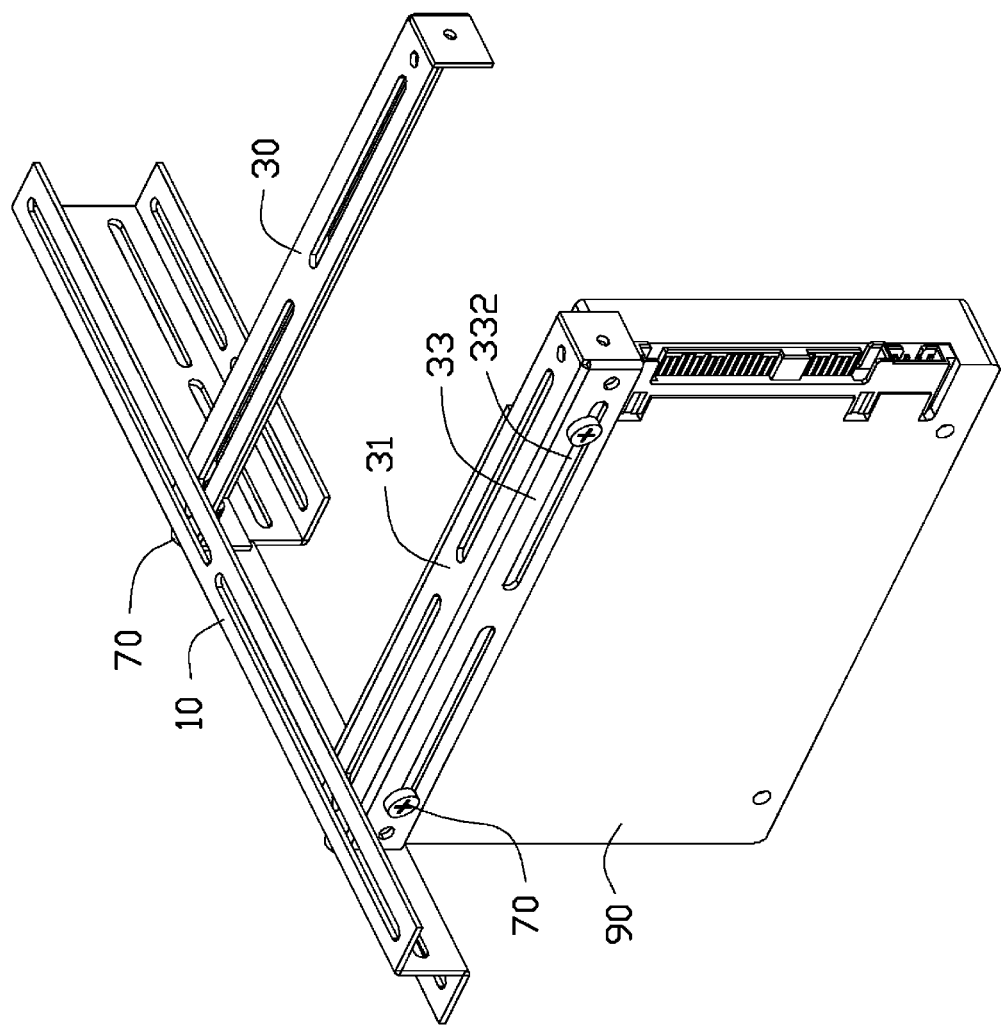
FIG. 6 is similar to FIG. 5, but shows the mounting structure being used to support a hard drive.

Alternatively, the mounting structure can be used for supporting other apparatuses. Referring to FIG. 6, in this example, a hard drive 90 is assembled on one connecting bracket 30. The hard drive 90 is vertical, and a side of the hard drive 90 is sandwiched between the two combining plates 35. The securing portions 73 of two corresponding connecting members 70 extend through the slots 332 of the second mounting plate 33, and are provisionally engaged with the hard drive 90 to slidably assemble the hard drive 90 on the connecting bracket 30. In this state, the securing portions 73 are slidable along the slots 332, and the hard disk 90 is thereby slidable along the slots 332 with the securing portions 73.

In this disclosure, because the fan 50 (or hard drive 90) is slidable along the connecting bracket(s) 30 and the connecting bracket(s) 30 is slidable along the securing bracket 10, the fan 50 (or hard drive 90) can avoid interfering with changed or added electronic components of the computer.

It is to be understood, however, that even though numerous characteristics and advantages of the embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting structure for supporting an apparatus of a computer, the mounting structure comprising:
   a securing bracket for fixing the mounting structure to the computer, the securing bracket comprising a connecting plate, a first flange extending outwardly from a top end of the connecting plate, a slot defined in a central portion of the connecting plate along a first axis, and another slot defined in the first flange along the first axis;
   a connecting bracket mounted on the securing bracket and slidable along the first axis relative to the securing bracket, the connecting bracket being adapted for slidably supporting the apparatus thereon such that the apparatus is slidable along a second axis relative to the connecting bracket, the second axis being different from the first axis; and
   a plurality of connecting members, one of the connecting members extending through the slot of the connecting plate and engaging with the connecting bracket to connect the connecting bracket with the securing bracket, with said one of the connecting members slidable along the slot of the connecting plate to allow the connecting bracket to slide relative to the securing bracket, said one of the connecting members capable of extending through the slot of the first flange and engaging with the connecting bracket when the connecting bracket is positioned thereat;
   wherein the apparatus is one of a fan and a hard drive.

2. The mounting structure of claim 1, wherein the connecting bracket defines at least a slot along the second axis, said one of the connecting members extending through the at least a slot of the connecting bracket and engaging with the apparatus to connect the apparatus with the connecting bracket, with said one of the connecting members slidable along the at least a slot to allow the apparatus to slide relative to the connecting bracket.

3. The mounting structure of claim 2, wherein the connecting bracket comprises a mounting plate and a combining plate connecting the mounting plate and engaging with the securing bracket, and the at least a slot is defined in the mounting plate.

4. The mounting structure of claim 2, wherein the connecting bracket comprises a first mounting plate, a second mounting plate extending from the first mounting plate, and a combining plate connecting between the first mounting plate and the second mounting plate, the at least a slot comprises two slots, and each of the first mounting plate and the second mounting plate defines one of the slots.

5. The mounting structure of claim 4, wherein the first mounting plate is substantially perpendicular to the second mounting plate.

6. The mounting structure of claim 1, wherein the first axis is substantially perpendicular to the second axis.

7. The mounting structure of claim 1, wherein the securing bracket further comprises a second flange extending outwardly from a side of a bottom end of the connecting plate, a slot is defined in the second flange along the first axis, and said one of the connecting members is capable of extending through the slot of the second flange and engaging with the connecting bracket when the connecting bracket is positioned thereat.

8. The mounting structure of claim 7, wherein the first and second flanges are oriented toward opposite directions and are both perpendicular to the connecting plate.

9. The mounting structure of claim 7, wherein the securing bracket further comprises an extending plate extending downwardly from a side of a bottom end of the connecting plate, a slot is defined in the extending plate along the first axis, and said one of the connecting members is capable of extending through the slot of the second flange and engaging with the connecting bracket when the connecting bracket is positioned thereat.

10. The mounting structure of claim 9, wherein a third flange perpendicularly connects a bottom end of the extending plate, a slot is defined in the third flange along the first axis, and said one of the connecting members is capable of extending through the slot of the third flange and engaging with the connecting bracket when the connecting bracket is positioned thereat.

11. The mounting structure of claim 10, wherein the third flange faces the first flange and is parallel to the first flange.

12. A mounting structure for supporting an apparatus of a computer, the mounting structure comprising:
a securing bracket defining at least one first slot along a first axis;
two connecting brackets being adapted for cooperatively supporting the apparatus, each connecting bracket comprising a first mounting plate and a combining plate connecting the first mounting plate, the first mounting plate defining a second slot along a second axis, the second axis being different from the first axis; and
a plurality of first connecting members and a plurality of second connecting members;
wherein two of the first connecting members extend through the at least one first slot of the securing bracket and respectively engage with the combining plates of the connecting brackets to connect the connecting brackets with the securing bracket, with the connecting brackets thereby slidable along the at least one first slot, and two of the second connecting members are capable of extending through the second slots of the first mounting plates and engaging with the apparatus when the apparatus is positioned thereat, with the second connecting members in unison with the apparatus slidable along the second slot;
wherein a second mounting plate extends downwardly from the first mounting plate of one of the connecting brackets and connects the combining plate, and one of the second connecting members is capable of extending through the third slot of the second mounting plate and engaging with the apparatus when the apparatus is positioned thereat, with the second connecting member in unison with the apparatus slidable along the third slot.

13. The mounting structure of claim 12, wherein the first mounting plates of the two connecting brackets are parallel with each other and coplanar with each other.

14. A mounting structure for supporting an apparatus of a computer, the mounting structure comprising:
a securing bracket defining five slots each oriented parallel to a first axis;
a connecting bracket being adapted for holding the apparatus, the connecting bracket comprising a first mounting plate and a combining plate connecting the first mounting plate, the first mounting plate defining a second slot along a second axis, the second axis being different from the first axis; and
a connecting member;
wherein the securing bracket comprises a connecting plate, a first flange extending from a top side of the connecting plate, a second flange extending from a bottom side of the connecting plate, an extending plate extending downwardly from part of the bottom side of the connecting plate, and a third flange connecting a bottom end of the extending plate, each of the connecting plate, the first flange, the second flange, the extending plate and the third flange defines one of the slots, and the connecting bracket is selectably attachable on one of the connecting plate, the first flange, the second flange, the extending plate and the third flange by the connecting member extending through the corresponding slot of the connecting plate, the first flange, the second flange, the extending plate or the third flange and engaging with a corresponding one of the combining plate or the mounting plate of the connecting bracket.

* * * * *